US011791059B2

(12) United States Patent
Banyay et al.

(10) Patent No.: US 11,791,059 B2
(45) Date of Patent: Oct. 17, 2023

(54) SYSTEM FOR CONTINUALLY MONITORING THE CONDITION OF NUCLEAR REACTOR INTERNALS

(71) Applicant: Westinghouse Electric Company LLC, Cranberry Township, PA (US)

(72) Inventors: Gregory A. Banyay, Ellwood City, PA (US); Richard A. Basel, Pittsburgh, PA (US); David C. DiBasilio, Pittsburgh, PA (US); Jeremy R. Koether, Beaver Falls, PA (US); Gregory A. Meyer, Bellefonte, PA (US); Stephen D. Smith, Harmony, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 65 days.

(21) Appl. No.: 17/183,493

(22) Filed: Feb. 24, 2021

(65) Prior Publication Data

US 2022/0270772 A1  Aug. 25, 2022

(51) Int. Cl.
*G21C 17/00* (2006.01)
*G21D 3/00* (2006.01)
(Continued)

(52) U.S. Cl.
CPC ............ *G21D 3/001* (2013.01); *G21C 17/00* (2013.01); *G21C 9/02* (2013.01); *G21C 17/08* (2013.01); *G21C 17/10* (2013.01); *G21D 3/06* (2013.01)

(58) Field of Classification Search
CPC ...... G21C 17/001; G21D 3/001; G21D 3/002; G09B 23/20; Y10S 706/907
(Continued)

(56) References Cited

U.S. PATENT DOCUMENTS 4,060,716 A * 11/1977 Pekrul ............... G05B 23/0283
376/217
4,961,898 A * 10/1990 Bogard ................ G21C 17/00
706/915

(Continued)

FOREIGN PATENT DOCUMENTS

CN   104795116 A  *  7/2015
CN   104795116 A     7/2015
CN   110402467 A    11/2019

OTHER PUBLICATIONS

Lin, Linyu, et al. "Development and assessment of a nearly autonomous management and control system for advanced reactors." Annals of Nuclear Energy 150 (2021): 107861. (Year: 2021).*

(Continued)

*Primary Examiner* — Jack W Keith
*Assistant Examiner* — Jinney Kil
(74) *Attorney, Agent, or Firm* — K&L Gates LLP (57) ABSTRACT

A system configured to monitor the structural health of reactor vessel internals of a nuclear reactor is disclosed herein. The system includes a memory configured to store historical information associated with past performance of the nuclear reactor, and an anomaly detection subsystem including a control circuit configured to receive a signal from a sensor. The anomaly detection subsystem is configured to determine, via the control circuit, a characteristic of a vibrational response of the reactor vessel internals based, at least in part, on the signal; access, via the control circuit, the historical information stored in the memory; compare, via the control circuit, the determined characteristic to the historical information stored in the memory; and determine, via the control circuit, a condition of the reactor vessel internals based, at least in part, on the comparison of the determined characteristic and the historical information.

4 Claims, 4 Drawing Sheets

(51) Int. Cl.
*G21C 9/02* (2006.01)
*G21C 17/08* (2006.01)
*G21C 17/10* (2006.01)
*G21D 3/06* (2006.01)

(58) Field of Classification Search
USPC .......................................... 376/259; 434/218
See application file for complete search history.

(56) References Cited

U.S. PATENT DOCUMENTS

| | | | |
|---|---|---|---|
| 2008/0069290 A1* | 3/2008 | Park | G21C 17/00 376/259 |
| 2018/0180516 A1* | 6/2018 | Kostyukov | G01M 7/00 |
| 2018/0254109 A1 | 9/2018 | Cheatham, III et al. | |

OTHER PUBLICATIONS

Garcia, Humberto E., Steven E. Aumeier, and Ahmad Y. Al-Rashdan. "Integrated state awareness through secure embedded intelligence in nuclear systems: Opportunities and implications." Nuclear Science and Engineering 194.4 (2020): 249-269. (Year: 2020).*

Ye, Yumei, et al. "Digital twin for the structural health management of reusable spacecraft: a case study." Engineering Fracture Mechanics 234 (2020): 107076. (Year: 2020).*

International Search Report and Written Opinion for International PCT Application No. PCT/US2022/070782, dated May 11, 2022.

Akerhielm et al., Surveillance of Vibrations in PWR, Progress in Nuclear Energy (Jan. 1, 982), 9:453-464.

Sunder et al., Reactor Diagnosis using Vibration and Noise Analysis in PWRs, Operations Safety of Nuclear Power Plants, Proceedings of Aninternational Symposium (May 2, 1983), 1:281-299.

Nuclear Power Plants—Pressurized water reactors—Vibration monitoring of internal structures (Nov. 4, 1999) retrieved from https://api.iec.ch/harmonized/publications/download/76602 [retrieved on Nov. 4, 1999].

Search Report for correspondence Taiwan Application No. 111106884, dated Jan. 13, 2023.

* cited by examiner

SYSTEM FOR CONTINUALLY MONITORING THE CONDITION OF NUCLEAR REACTOR INTERNALS

FIELD

The present disclosure is generally related to nuclear power generation and, more particularly, is directed to improved systems and methods for continually assessing the condition of nuclear reactor internals.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a system configured to monitor the structural health of reactor vessel internals of a nuclear reactor is disclosed. The system includes: a memory configured to store historical information associated with past performance of the nuclear reactor, and an anomaly detection subsystem including a control circuit configured to receive a signal from a sensor. The anomaly detection subsystem is configured to determine, via the control circuit, a characteristic of a vibrational response of the reactor vessel internals based, at least in part, on the signal; access, via the control circuit, the historical information stored in the memory; compare, via the control circuit, the determined characteristic to the historical information stored in the memory; and determine, via the control circuit, a condition of the reactor vessel internals based, at least in part, on the comparison of the determined characteristic and the historical information.

In various aspects, a system configured to monitor the structural health of reactor vessel internals within a nuclear reactor is disclosed. The system includes: a memory configured to store historical information associated with past performance of the nuclear reactor; and a mechanical diagnostic subsystem communicably coupled to the memory, wherein the mechanical diagnostic subsystem includes a control circuit. The mechanical diagnostic subsystem is configured to generate, via the control circuit, a model of at least a portion of the nuclear reactor; and generate, via the control circuit, a diagnostic conclusion associated with the nuclear reactor based, at least in part, on a determined condition of the reactor vessel internals and the generated model.

In various aspects, a method of monitoring the structural health of reactor vessel internals within a nuclear reactor is disclosed herein. The method includes: receiving a signal from a sensor, wherein the signal is associated with a level of neutron noise emitted by the nuclear reactor; determining a characteristic of a vibrational response of the reactor vessel internals based, at least in part, on the received signal; accessing historical information associated with a past performance of the nuclear reactor; comparing the determined characteristic to the historical information stored in the memory; and determining a condition of the reactor vessel internals based, at least in part, on the comparison of the determined characteristic and the historical information.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Before explaining various aspects of the systems and methods disclosed herein in detail, it should be noted that the illustrative examples are not limited in application or use to the details of disclosed in the accompanying drawings and description. It shall be appreciated that the illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Specifically, it shall be appreciated that any discussion of a particular nuclear reactor (e.g., pressurized water reactors) and its components (e.g., reactor vessel internals, or "RVI") are merely illustrative. Accordingly, it shall be appreciated that the systems and methods disclosed herein can be applied to continuously monitor the condition of any aspect—internal or external—of any nuclear reactor. For example, the systems and methods disclosed herein can be applied to continuously monitor any component or subassembly of a MAGNOX reactor, a CANDU reactor, a light-water reactor (LWR), an advanced-gas cooled (AGR) reactor, a high-powered channel-type reactor (RBMK), a low-enriched uranium (LEU) fueled reactor, a highly-enriched uranium (HEU)-fueled reactor, and/or liquid metal fast reactors, amongst others. Additionally, it shall be appreciated that the systems and methods disclosed herein are more generally capable of assisting with the continuous monitoring and inspection of any mechanical complex and/or hazardous system. As such, the systems and methods disclosed herein can be useful in a vast array of industrial applications. As used herein, the term "continuous" shall not preclude the use of the systems and methods disclosed herein from being implemented to intermittently monitor a nuclear reactor. For example, although the systems and methods disclosed herein are capable of continuously monitoring the nuclear reactor, they can be configured to monitor the reactor according to a predetermined interval. Finally, it shall be appreciated that one or more of the following-described aspects, expressions of aspects, and/or examples, can be combined with any one or more of the other following-described aspects, expressions of aspects, and/or examples.

Additionally, the systems and methods disclosed herein are discussed as implemented via a plurality of subsystems exclusively for illustrative purposes. Accordingly, it shall be appreciated that, in some non-limiting aspects, the anomaly detection subsystem and mechanical diagnostic subsystem can be implemented as a single system configured to perform the collective functions of both subsystems. Some non-limiting aspects include a single, consolidated system that further includes a user interface configured to display an alert and/or run the asset management platform. As such, it shall be appreciated that any of the subsystems disclosed herein—including their respective functions—can be either consolidated or partitioned into any number or more system or subsystems. The methods disclosed herein shall not be limited by any system architecture.

Nuclear reactors (e.g., pressurized water reactors, amongst others) have complex geometrical configurations that include many integrated components. The complexity of a nuclear reactor's design—in conjunction with the potential of hazardous exposure to radiation—makes it extremely difficult, dangerous, and impractical for personnel to continuously inspect and maintain various subsystems and components. Internal components are specifically challenging to continuously monitor due to their proximity to the pressure boundary of the reactor and/or radioactive fuel rodlets. For example, RVI, such as grids, control rods, guide tubes, plates, fasteners, springs, welds, joints, and/or nozzles can be particularly difficult to monitor. However, such components undergo severe stresses and are particularly susceptible to degradation throughout the life of the reactor. Stress corrosion cracking, support key wear, and other damage inflicted on RVI can manifest in various mechanical anomalies that can adversely impact the operation and/or reliability of a nuclear reactor. Although it is essential to identify the early onset and/or propagation of RVI degradation, continuous monitoring of RVI can be extremely difficult due to the radioactive environment.

Due to the complexity of design and the inherent hazard associated with the radioactivity of nuclear reactors, monitoring the structural health of RVI is limited to time and/or condition based policies. For example, a plant may require RVI to be inspected and serviced a prescribed number of times over a specific period. Alternatively and/or additionally, inspection and/or service may be required only after an anomalous condition manifests. Accordingly, conventional methods of monitoring the structural health of RVI are not proactive and problems are only addressed after they have occurred. Although methods of monitoring a nuclear reactor via an ex-core detector have been implemented, they have been reluctantly adopted—if not outright rejected—by plants, particularly in the United States. This is due, in part, to a lack of confidence in an assessment of RVI structural health based exclusively on a measurement (e.g., neutron noise) generated by an ex-core detector. In other words, known means of monitoring an RVI rely exclusively on ex-core detectors and their diagnostic conclusions generally lack context, credibility, and leave critical questions unanswered. Additionally, known means of monitoring an RVI via an ex-core detector necessitate extensive analysis, which is typically performed by a select number of highly-specialized engineers. As such, known means of monitoring RVI structural health can tend to be inefficient, expensive, reactive, and include a non-negligible risk of false diagnosis. This results in an unacceptable—and expensive—degree of risk. Accordingly, there is a need for enhanced systems and methods for assessing the condition of nuclear reactor internals.

Figure 1:
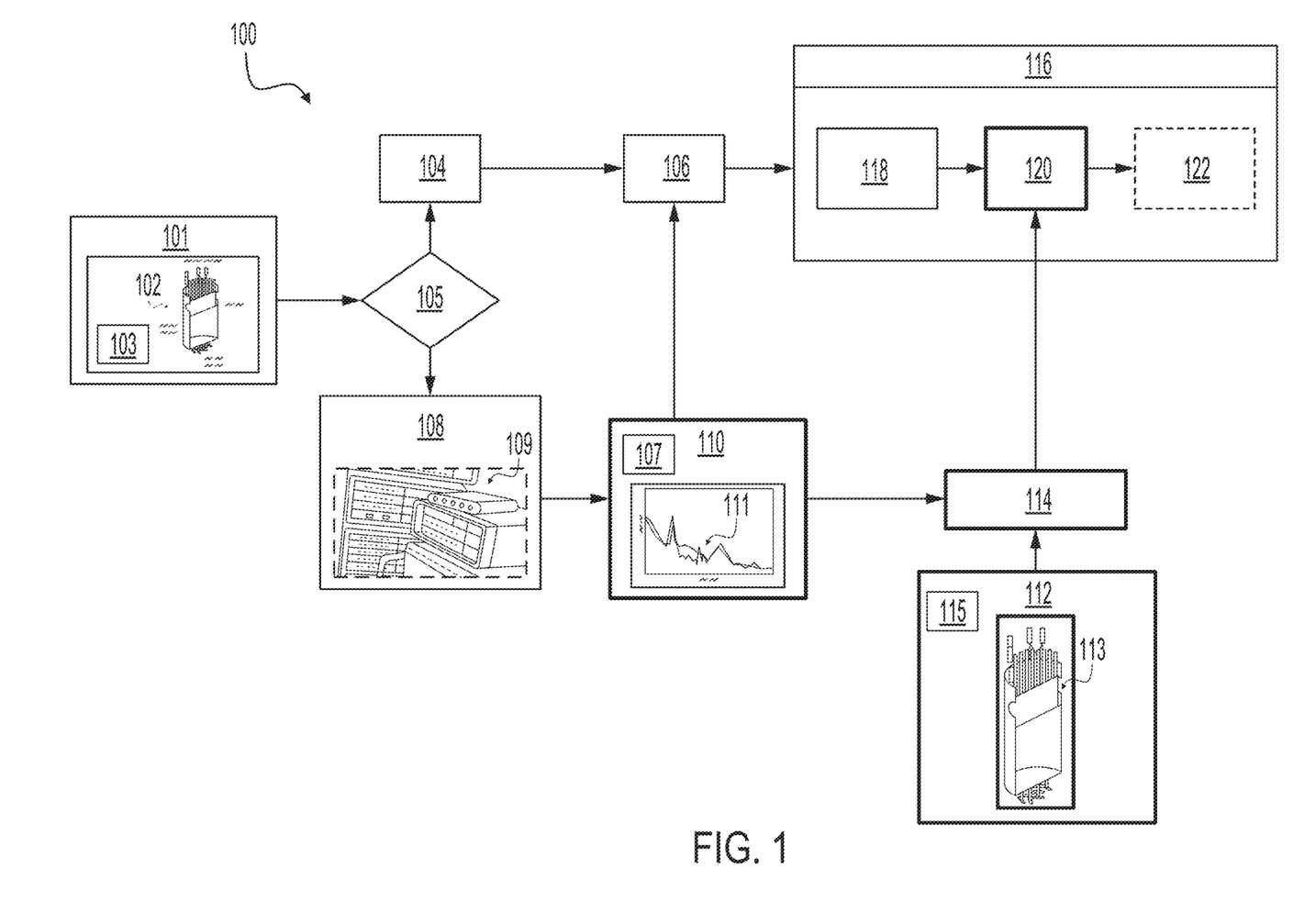
FIG. 1 illustrates a diagram of a system configured to monitor the condition of nuclear reactor internals, in accordance with at least one non-limiting aspect of the present disclosure.

Referring now to FIG. 1, a diagram of a system 100 configured to continuously monitor the condition of a nuclear reactor, including RVI, is depicted in accordance with at least one non-limiting aspect of the present disclosure. According to the non-limiting aspect of FIG. 1, the system 100 can be configured to monitor and assess the structural health of a nuclear reactor 102 in a nuclear plant 101. For example, the system can include an anomaly detection subsystem 110 communicably coupled to a sensor 103, such as a detector. It shall be appreciated that the term "communicably coupled" shall include any configuration in which the signals can be transmitted between the sensor 103 and the anomaly detection subsystem 110. This shall include any means of wired and/or wireless communication—both infrastructure and ad hoc. Accordingly, the anomaly detection subsystem 110 and sensor 103 can be communicably coupled via a variety of connections, including, but not limited to: local area network (LAN), coaxial cable, radiofrequency (RF) transmission, infrared, WiFi®, Bluetooth®, near-field communications (NFC), and/or cellular network, amongst others. Additionally and/or alternatively, it shall be appreciated that the connection can include any intermediate systems, subsystems, and/or components between the sensor 103 and anomaly detection subsystem 110.

Additionally, it shall be appreciated that, although the non-limiting aspect of FIG. 1 contemplates a sensor 103 that includes a detector, other non-limiting aspects contemplate in-core sensors that can be used to determine neutron noise or flux. Additionally and/or alternatively, any number of sensors 103 can be implemented—and in-core alike—to measure the neutron flux about the nuclear 102 reactor and more generally, throughout the plant 101. For example, according to some non-limiting aspects where the system 100 is implemented for intermittent monitoring, the sensor 103 may include an in-core detector. According to some non-limiting aspects, the sensor 103 can include any configuration of: gas-filled detectors, boron lined detectors, scintillating glass fiber detectors, and/or dual-detectors, amongst others. However, according to other non-limiting aspects, the sensor 103 can include any sensor, including more conventional vibration sensors, such as, accelerometers, strain gages, displacement sensors and/or velocity sensors positioned throughout the plant. The sensor 103 can be configured to measure—and generate a signal associated with—a mechanical response (e.g., a vibration) of the nuclear reactor. According to non-limiting aspects of the present disclosure wherein the system 100 is implemented to monitor the structural health of a non-nuclear device 102 in a plant 101, the sensor 103 can include any component capable of measuring and mechanical response of the non-nuclear device 102. According to some non-limiting aspects, the sensor 103 can be communicably coupled to a data acquisition subsystem 108 configured to process and/or aggregate signals received from the sensor 103 prior to processing by the anomaly detection subsystem 110.

In further reference to FIG. 1, the anomaly detection subsystem 110 can include a data acquisition unit 109. At a minimum, the anomaly detection subsystem 110 can include a control circuit 107 configured to receive the signal from the sensor 103 and perform algorithmic spectral analyses to assess and contextualize information embedded in said signal. According to the non-limiting aspect of FIG. 1, the analysis can be dynamic and/or automated—meaning information is continuously gathered by the sensor 103, communicated to the anomaly detection subsystem 110, and processed. As such, it shall be appreciated how the system 100 of FIG. 1 represents a dramatic technical improvement over conventional means of assessing the structural health of a nuclear reactor, including RVI. Additionally, and/or alternatively, the system 100 can assess the structural health of a nuclear reactor 102 in a way that is impractical—if not impossible—for a human technician or engineer. Obviously, if a plant 101 were to employ personnel to continuously monitor the structural health of the nuclear reactor 102, the cost would be inordinate and the assessment would still be susceptible to human error. Furthermore, the continuous assessment of the nuclear reactor 102 enables the system 100 to proactively identify issues within the nuclear reactor 102 that conventional means would only be able to detect upon manifestation, which promotes economic efficiency and safety. In other words, the system 100 of FIG. 1 technologically improves upon known means of assessing the condition of a nuclear reactor and RVI.

Still referring to FIG. 1, the sensor 103 can be configured to generate a signal that is associated with level of neutron noise and/or flux emitted by the nuclear reactor 102. The signal can be transmitted to the anomaly detection subsystem 110, which is configured to determine a characteristic of a mechanical response of the nuclear reactor—including the RVI—based, at least in part, on the received signal. For example, the anomaly detection subsystem 110 can determine vibration mode frequencies and/or amplitudes based on the signal. According to some non-limiting aspects, the determination can be further based on prior in-plant information and/or scale model testing, amongst other data points. According to some non-limiting aspects, the anomaly detection subsystem 110 can be configured to process the signal via Fourier, phase mode shape plots, and/or wavenumber analysis to statistically infer a particular mode of the mechanical response (e.g., frequencies, narrowband amplitudes). For example, the anomaly detection subsystem 110, and more specifically the control circuit 107, can be configured to utilize wavenumber spectra (e.g., peak identification, mode matching), cross spectrum phase plotting with pattern recognition, and/or other means of statistical inference, to characterize a mechanical response. However, it shall be appreciated that, according to other non-limiting aspects of the present disclosure, any number of other analytical methods can be applied to characterize any mechanical response. In other words, the anomaly detection subsystem 110 can utilize signals it receives from the sensor 103 to identify specific behaviors of the reactor 102 and its RVI, which is an important step in performing a credible structural assessment of the nuclear reactor and its RVI.

Regarding the characterization of the mechanical response, the characterization performed by anomaly detection subsystem 110 can be associated with any number of mechanical anomalies For example, the reactor 102 may respond in a particular way to any number of conditions indicative of the structural health of the RVI, and the anomaly detection subsystem can be implemented to continuously monitor and characterize such behavior. For example, such conditions can include the vibration and/or degradation of radial supports, fuel nozzles, thermal shield supports, baffle jetting, broken baffle-former bolts, acoustic phenomena, lower plenum anomalies, upper plenum anomalies, thimble tube vibration, rod cluster assembly vibration, wedged parts, and/or application to wear associated with such vibration and/or degradation. Of course, it shall be appreciated that the system 100 can be implemented to monitor and characterize other conditions associated with the structural health of a complex mechanical device such as a nuclear reactor 102, depending on user preference and/or intended application.

In further reference to FIG. 1, the system 100 can further include a memory 104 configured to store historical information associated with the plant 101 and/or past performance of the nuclear reactor 102. The memory 104 can be communicably coupled to the anomaly detection subsystem 110 and the anomaly detection subsystem 110 can access, via its control circuit 107, the stored historical information. Accordingly, the anomaly detection subsystem 110 can be configured to combine and compare the determined characteristic of the mechanical response of the reactor 102 and its RVI with the historical data stored in the memory 110. In this way, the system 100 can not only determine a characteristic of a mechanical response of a reactor 102, but contextualize that response to determine what, specifically, is occurring within the reactor 102 and its RVI. For example, the anomaly detection subsystem 110 may compare a determined vibrational frequency and/or amplitude to a past vibrational frequency and/or amplitude of the reactor 102 under a certain condition—for example, a degraded baffle. As such, the anomaly detection subsystem 110 may conclude that the determined characteristic is a result of a similar condition, and provide an alert to a technician to inspect the baffles. Of course, it shall be appreciated that the anomaly detection subsystem 110 can identify orbital motion, impacting, and acoustic excitation within the RVI of a nuclear reactor 102 in similar fashion.

Accordingly, the anomaly detection subsystem 110 of FIG. 1 can not only characterize a mechanical response of the reactor 102 and its RVI, but can compare the determined response to historical information stored within the memory 104 to contextualize the determined response. In other words, the anomaly detection subsystem 110 enables the system 100 to identify and understand mechanical anomalies simply through the everyday use of the reactor, which represents a technological improvement over known means of assessing the structural health of RVI.

Still referring to FIG. 1, the anomaly detection subsystem 110 can be further configured to generate, via the control circuit 107, an alert 111 including RVI insights 111 that would be otherwise inaccessible to the plant 101 and/or its operating technicians. The insights 111 can include any number of formatted graphs, charts, messages, and/or alarms associated with the signal, the determined characteristic of the mechanical response, historical information stored in the memory 104, the determined condition of the RVI, and/or any additional information associated with the either the sensor 103 or the reactor 102. Additionally and/or alternatively, the alert 111 can include instructions for reactor 102 care and/or maintenance. For example, the alert 111 can include a revised maintenance plan for the reactor 102 and its RVI, or subcomponents thereof. The revised maintenance plan can be determined by the anomaly detection subsystem based, at least in part on, the determined characteristic of mechanical response, historical information stored in the memory 104, and/or the determined condition of the RVI. In some non-limiting aspects, the alert 111 can be transmitted to the asset management platform and/or viewed via the asset management platform 116, via diagnostic information 120 and/or predictions 122. According to some non-limiting aspects, the system 100 can be automated such that the anomaly detection subsystem 110 is configured to autonomously take a remedial action based, at least in part, on information in the alert 111. For example, the system 100 may automatically adjust valves to attenuate a variable of reactor 102 operation, such as pressure. According to other non-limiting aspects, the alert 111 can trigger an indicator, such as a light, and audible alarm, and/or any form of haptic feedback to ensure operating technicians review its information.

The system 100 of FIG. 1 can include a user interface configured to display such the alert 111. However, it shall be appreciated that, according to other non-limiting aspects, the system 100 can further include a remote device communicably coupled to the anomaly detection subsystem 110. According to such aspects, the anomaly detection subsystem 110 can be further configured to transmit the alert 111—either via wired or wireless communication—to the remote device. For example, according to one non-limiting aspect, the remote device can include the mobile device of an operating technician and the anomaly detection subsystem 110 can be configured to transmit the alert 111 to the mobile device via text message, phone call, page, electronic mail, and/or any other compatible forms of communication.

In further reference to FIG. 1, the anomaly detection subsystem 110 can be further configured to either generate, contribute to, or run in parallel to a digital twin 114 of the nuclear reactor 102. The digital twin 114 can serve as a validated mechanics-based model that can produce credible diagnostic conclusions. According to some non-limiting aspects, the digital twin 114 can include an integrated, physics-based, appropriately scaled, probabilistic simulation of an as-built system, structure, or component of the nuclear reactor 102 or RVI. Accordingly, the anomaly detection subsystem 110 can utilize any available resources (e.g., physics models, sensor updates, operating experience, etc.) to mirror the life of its corresponding operating twin, the nuclear reactor 102, itself. It shall be apparent that the integration of the characterized mechanical response and the determined condition of the nuclear reactor 102 and its RVI into the digital twin 114 can improve the contextualization and insights produced by the anomaly detection subsystem 110 and thus, enhance the understanding of the structural health of the nuclear reactor 102. Accordingly, the system 100 of FIG. 1 represents an even further technological improvement over known means of using detectors to monitor RVI because the digital twin 114 offers a data-driven, physics-informed, and empirically valid assessment of the structural health of RVI. As such, the digital twin 114 alone can improve credibility and can instill actionable confidence in operating technicians sufficient enough to overcome resistance to automated solutions and reduce the aforementioned reliance on reactive, time or condition-based maintenance.

The system 100 of FIG. 1 can further include a mechanical diagnostic subsystem 112. According to the non-limiting aspect of FIG. 1, the mechanical diagnostic subsystem 112 can be communicably coupled to the sensor 103, the anomaly detection subsystem 110, and/or the memory 104. The mechanical diagnostic subsystem 112 can also include a second control circuit 115 configured to either generate and/or access a model of at least a portion of the nuclear reactor 102. According to some aspects, the model can be three-dimensional—or surrogate—model 113 of the nuclear reactor 102, however according to other non-limiting aspects, the model can include an aggregation of data acquired from one or more sensors positioned throughout the nuclear reactor 102. In some non-limiting aspects, the model 112 can include a CAD-based mesh structure configured to support finite element modeling and/or dynamic simulations. Of course, other non-limiting aspects include any known means of simulation or modeling. As such, the mechanical diagnostic subsystem 112 can parameterize data received from the anomaly detection subsystem 110 and/or the digital twin 114, incorporate received data into the model 113, and simulate dynamic scenarios associated with the structural dynamics of the nuclear reactor 102 and its RVI.

The mechanical diagnostic subsystem 112 of FIG. 1 can be configured to perform a sensitivity analysis of characteristics and conditions—or candidate degradation scenarios—it receives from either the anomaly detection subsystem 110 and/or digital twin 114. As is true for most sensitivity analyses, the mechanical diagnostic subsystem 112 can determine how different values of an independent variable can affect a particular dependent variable under a given set of assumptions. In other words, the sensitivity analysis can assess the level of mathematical uncertainty associated with a particular candidate degradation scenario, as determined by the anomaly detection subsystem 110.

Still referring to FIG. 1, the mechanical diagnostic subsystem 112 can be further configured to assess and improved upon in-plant data that is sensed by the sensor 103 and processed by the anomaly detection subsystem 110. For example, the mechanical diagnostic subsystem 110 can transmit modeled and/or simulated mechanical information to the digital twin 114, which can serve as a benchmark against which the candidate degradation scenarios can be compared. According to some non-limiting aspects, the digital twin 114 can utilize such mechanical information to overlay candidate degradation scenarios onto the model 113 of the nuclear reactor 102 or, more specifically, the RVI.

In other words, the mechanical diagnostic subsystem 112 of FIG. 1—and its contributions to the digital twin 114—can asses—the credibility of each candidate degradation scenario (e.g., characteristics, conditions) determined by the anomaly detection subsystem 110. The mechanical diagnostic subsystem 112 can then generate one or more diagnostic conclusions based on the assessment. Additionally, the continuous nature of the system 100 monitoring can enable the mechanical diagnostic subsystem 112 to update its simulations in real time. Thus, the mechanical diagnostic subsystem 112 can quickly dispel implausible degradation scenarios and focus on an accurate assessment of structural health of the nuclear reactor 102 and/or its RVI. The assessed likelihood of each candidate degradation scenario can be included in a diagnostic conclusion generated by the mechanical diagnostic subsystem 110, which can further include historical remedial information accessed from the memory 104, which correlates to the most likely candidate degradation scenarios.

According to some non-limiting aspects, the mechanical diagnostic subsystem 112 can be further configured to implement artificial intelligence, machine learning, deep learning, and/or neural network techniques based to improve its assessment of candidate degradation scenarios received from the anomaly detection subsystem 110. As such, the simulations and sensitivity analyses performed by the mechanical diagnostic subsystem 112 can improve in accuracy throughout the life of the system 100. For example, according to some non-limiting aspects, the mechanical diagnostic subsystem 112 can be algorithmically configured to improve its assessment of candidate degradation scenarios via Gaussian Process Regression (GPR), machine learning (e.g., k-NN, correlation grouping, etc.), and/or neural network techniques. Of course, it shall be appreciated that any artificial intelligence, machine learning, deep learning, and/or neural network techniques can be implemented to train and/or verify the mechanical diagnostic subsystem 112 and improve the model 113. Accordingly, the computation of parameter sensitivities and subsequent sensitivity analysis of candidate degradation scenarios can continually improve in time.

Accordingly, the mechanical diagnostic subsystem 110 can continuously and efficiently assess the credibility of the analysis performed by the anomaly detection subsystem 110 and can further generate diagnostic conclusions that illustrate likely sources of degradation within the RVI and inform future inspections and/or maintenance. In some non-limiting aspects, the diagnostic conclusion can visually highlight likely sources of degradation via the aforementioned user interface and/or remote device, including the likely location of degradation within the model 113 of the RVI. In some non-limiting aspects, the diagnostic conclusion can include a list of sources of degradation that is ranked by likelihood, as determined by the mechanical diagnostic subsystem 112. Additionally and/or alternatively, the mechanical diagnostic subsystem 112 can integrate the diagnostic conclusion into the digital twin 114 and/or include the diagnostic conclusion in the alert 111. Regardless, the integration of products from the mechanical diagnostic subsystem 112 (e.g., the diagnostic conclusion) and products of the anomaly detection subsystem 110 (e.g., determined characteristic of mechanical response, condition of the nuclear reactor) can be used for pattern recognition. The pattern recognition becomes even more powerful as the historical base of characteristics, conditions, and diagnostic conclusions stored in the memory 104 grows, since the mechanical diagnostic subsystem 112 can be configured to utilize artificial intelligence, machine learning, deep learning, and/or neural network techniques to improve. For example, according to one non-limiting aspect, the mechanical diagnostic subsystem 112 can employ a method of machine learning based on a support vector machine (SVM).

Additionally and/or alternatively, the system 100 of FIG. 1 can generate a probabilistic model of the determined characteristics, conditions, and diagnostic conclusions, can review all of the relationships between these variables, and can reason causal probabilities for scenarios based on the available evidence generated by the sensor 103 and historical information stored in the memory 104. The system 100, as a whole, can be further configured to diagnostically assess the nuclear reactor 102 and its RVI. In other words, the system 100 can format the diagnostic conclusions in a conditional probability table that is nested in a Bayesian Belief Network to substantiate its diagnostic models. According to some non-limiting aspects, the Bayesian Belief Network can be employed by the asset management platform 116 to produce diagnostic information 120.

In further reference to FIG. 1, the system can further include an asset management platform 116 configured to aggregate outputs of the anomaly detection subsystem 110 and historical information from the memory 104, mechanical diagnostic subsystem 114. The asset management platform 116 can be further configured to receive the diagnostic conclusion directly from the mechanical diagnostic subsystem 112 and/or the digital twin 114 as well as any aggregate inputs 106. The asset management platform 116 can be further configured to generate diagnostic conclusions, alerts, and/or other useful information associated with the RVI based on inputs it receives from the mechanical diagnostic subsystem 112, anomaly detection subsystem 110, and/or digital twin 114 to generate diagnostic conclusions. According to the non-limiting aspect of FIG. 1, the asset management platform 116 can be further configured to generate and/or display a definitive anomaly 118, based on probabilistic, sensitivity analyses. The asset management platform 116 of FIG. 1 can be further configured to generate and/or display diagnostic information 120, which can include information extracted from the diagnostic conclusion and model 113, as well as relevant historical information extracted from the memory 104. Additionally, and/or alternatively, the asset management platform 116 can be further configured to generate and/or display a prediction of future behavior 122 associated with the nuclear reactor 102 and its RVI. For example, if the detected anomaly is associated with a structural component and/or subassembly of the RVI, the asset management platform 116 can predict potential fatigue damage of the RVI and nuclear reactor 102. Of course, it shall be appreciated that the asset management platform 116 of FIG. 1 can be configured to display any prediction associated with any anomaly detected. According to some non-limiting aspects, the asset management platform can be further configured to display the alert 111 and/or provide preventative actions, such as the autonomous placement of the nuclear reactor 102 into a "safe mode" until preventative maintenance can be performed.

According to other non-limiting aspects, the asset management platform 116 can be scalable and thus, configured to be accessed via any computer and/or mobile computing device, including but not limited to a standard desktop computer, a laptop computer, a mobile device—including a smart phone, a tablet, a wearable computer, and/or a personal digital assistant. Of course, it shall be appreciated that the asset management platform 116 can be remotely accessed via any connected device featuring a display and/or a user interface. This represents yet another technological improvement of the system 100 of FIG. 1, because any operating technician associated with the plant 101 can access the asset management platform 116 from any device and/or location to review the condition of the nuclear reaction 102 and its RVI, recommendations, and/or diagnostics. Accordingly, operating technicians can operate as a collective team without having to be physically present in the plant.

Figure 2:
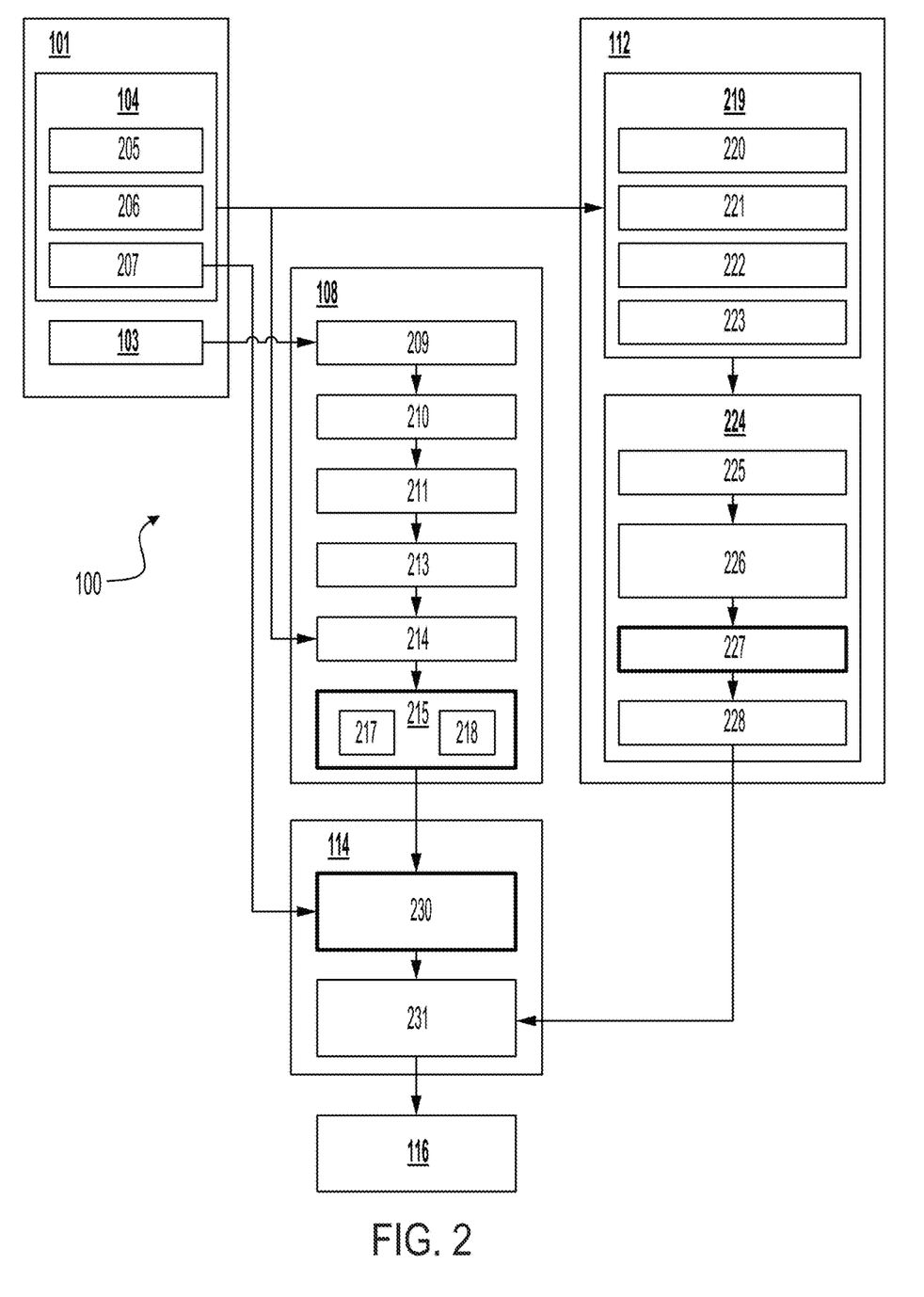
FIG. 2 illustrates a block diagram depicting the systematic functions of the system of FIG. 1, in accordance with at least one non-limiting aspect of the present disclosure.

Referring now to FIG. 2, a block diagram illustrating the systematic functions of the system 100 of FIG. 1 is depicted in accordance with at least one non-limiting aspect of the present disclosure. According to the non-limiting aspect of FIG. 2, the plant 101 can include a memory 104 as well as the sensor 103. As previously discussed, the memory 104 can be configured to store non-dynamic, historical information, including hot functional data 205, scale model test data 206, and/or prior neutron noise data 207, amongst others. Additionally, the plant 101 can include a sensor 103 configured to detect and record dynamic data associated with a mechanical response of the nuclear reactor 102 (FIG. 1), such as a neutron noise level. As previously noted, the sensor 103 of FIGS. 1 and 2 can be an sensor, but other non-limiting aspects contemplate any number of sensors depending on user preference and/or intended application.

In further reference to FIG. 2, the system 100 can further include an anomaly detection subsystem 110 configured receive dynamic signals from the sensor 103 and access non-dynamic historical information from the memory 104 to determine a characteristic 217 of the mechanical response and a condition 218 of the nuclear reactor. In order to accomplish this, the anomaly detection subsystem 110 can include a control circuit 107 configured to process information received from the sensor 103 and/or memory 104 via covariance matrix calculations 209, wavenumber decompositions 210, data normalizations 211, direct current voltage shifts 213, mode identification 214 and ultimately, feature extraction 215. For example, the feature extraction 215 process can include the determination of a characterization 217 of a mechanical response of the nuclear reactor 102 (FIG. 1) and its RVI, such as a frequency and/or amplitude of a vibration response. Additionally, the feature extraction can include the determination of a condition 219 of the nuclear reactor 102 (FIG. 1) and its RVI.

Still referring to FIG. 2, the system can include a mechanical diagnostic subsystem 112 configured to generate a diagnostic conclusion associated with the nuclear reactor based, at least in part, on historical information stored in the memory 104, the determined condition 217 of the reactor vessel internals, and/or a model 113 (FIG. 1) of the RVI. According to the non-limiting aspect of FIG. 2, the mechanical diagnostic subsystem 112 can include a control circuit 115 configured to generate or simulate the behavior the model 113 (FIG. 1) and execute a model parameterization module 219 and a sensitivity analytical module 224. The model parameterization module 219 can be configured to model thermal shield flexure and/or bolt degradation 220, baffle-former bolt degradation 221, fold down spring relaxation 222, and/or core barrel cracking 223 within the RVI, amongst other potential anomalies associated with continued use of the nuclear reactor 102 (FIG. 1). The sensitivity analytical module 224 can be configured to define a parameter space 225, computer the design of experimental sampling 226, train a surrogate model 227 (e.g., via Gaussian Process Regression), and/or compute parameter sensitivities 228 (e.g., via linear and rank correlation analysis and/or global variance-based sensitivity analyses). Both the sensitivity analytical module 224 and model parametrization module 219 can be configured to collectively generate a diagnostic conclusion associated with the nuclear reactor 102 (FIG. 1) and its RVI.

According to the non-limiting aspect of FIG. 2, both the anomaly detection subsystem 110 and the mechanical diagnostic subsystem 112 can be configured to synthesize inputs in the digital twin 114 of the nuclear reactor 102 (FIG. 1) and its RVI. For example, the anomaly detection subsystem 110 can be configured to transmit the determined characteristic 217 and condition 219 to the digital twin 114 and the mechanical diagnostic subsystem 112 can be configured to transmit the diagnostic conclusion to the digital twin 114. Upon determining the characteristic 217 and condition 219 and generating the diagnostic conclusion, the system 100 can execute an anomaly detection pattern recognition module 230 and/or perform a diagnostic analysis via a Bayesian Belief Network 231 via the anomaly detection subsystem 110 and/or the mechanical diagnostic subsystem 112. The resulting information can be synthesized into a digital twin 114 of the nuclear reactor 102 (FIG. 1) and its RVI.

Figure 3:
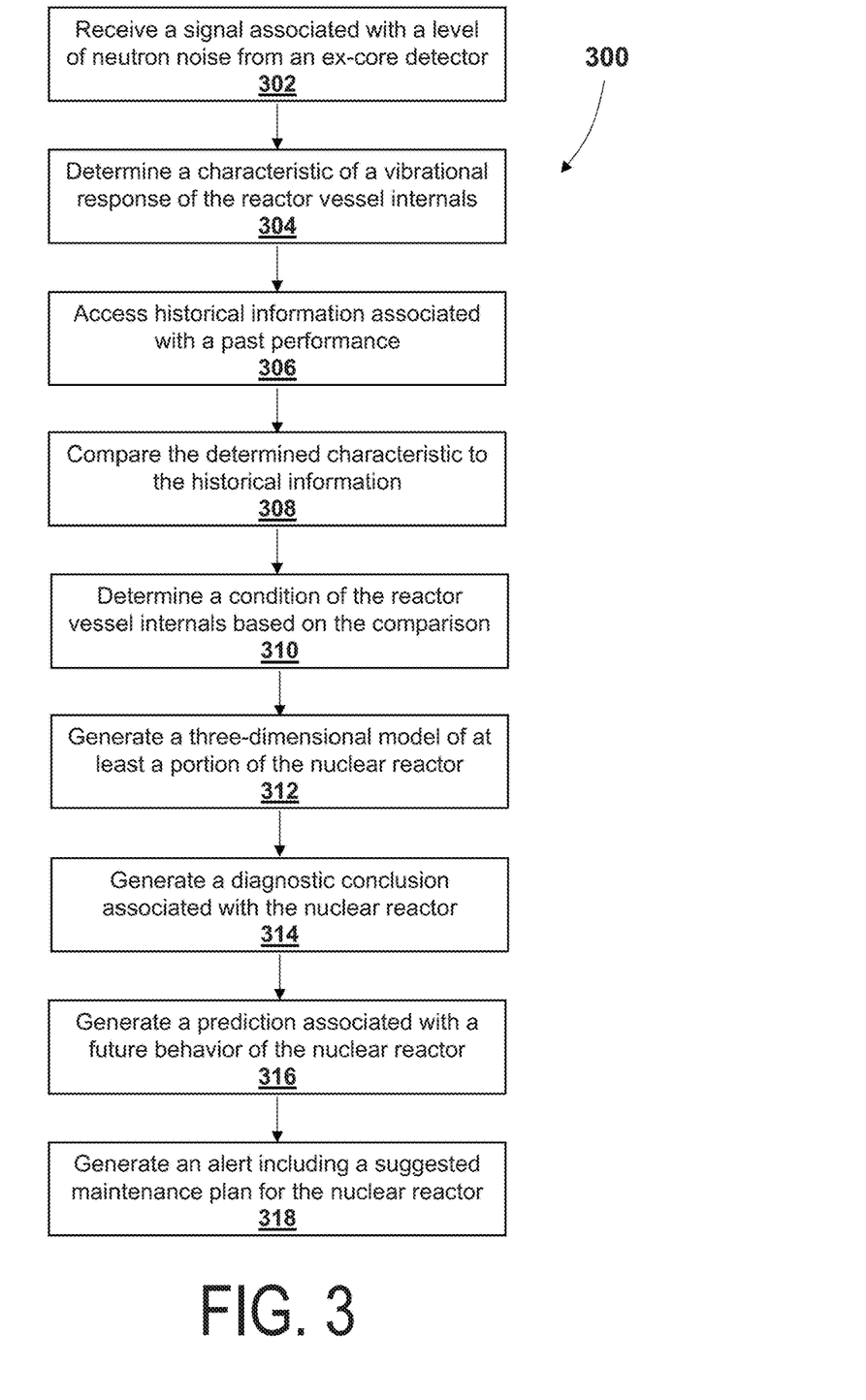
FIG. 3 illustrates a method of continually monitoring the condition of nuclear reactor internals in accordance with at least one non-limiting aspect of the present disclosure.

Referring now to FIG. 3, a method 300 of continually monitoring the condition of nuclear reactor internals is depicted in accordance with at least one non-limiting aspect of the present disclosure. According to the non-limiting aspect of FIG. 3, the method 300 can include receiving a signal from a detector, wherein the signal is associated with a level of neutron noise emitted by the nuclear reactor 302. After receiving the signal, the method 300 can determine a characteristic of a vibrational response of the reactor vessel internals based, at least in part, on the received signal 304. The method 300 can further include accessing historical information associated with a past performance of the nuclear reactor 306 and comparing the determined characteristic to the historical information stored in the memory 308. The method can further include determining a condition of the reactor vessel internals based, at least in part, on the comparison of the determined characteristic and the historical information 310.

According to some non-limiting aspects of the present disclosure, the method 300 can further include generating a model of at least a portion of the nuclear reactor 312 and generating a diagnostic conclusion associated with the nuclear reactor based, at least in part, on the determined condition of the reactor vessel internals and the generated model 314. Still further non-limiting aspects call for the generating a prediction associated with a future behavior of the nuclear reactor based, at least in part, on the determined condition of the reactor vessel internals and the diagnostic conclusion associated with the nuclear reactor 316. Other non-limiting aspects of the present disclosure include generating an alert, wherein the alert comprises a suggested maintenance plan for the reactor vessel internals based, at least in part, on the determined condition of the reactor vessel internals and the diagnostic conclusion associate with the nuclear reactor 318.

Figure 4A:
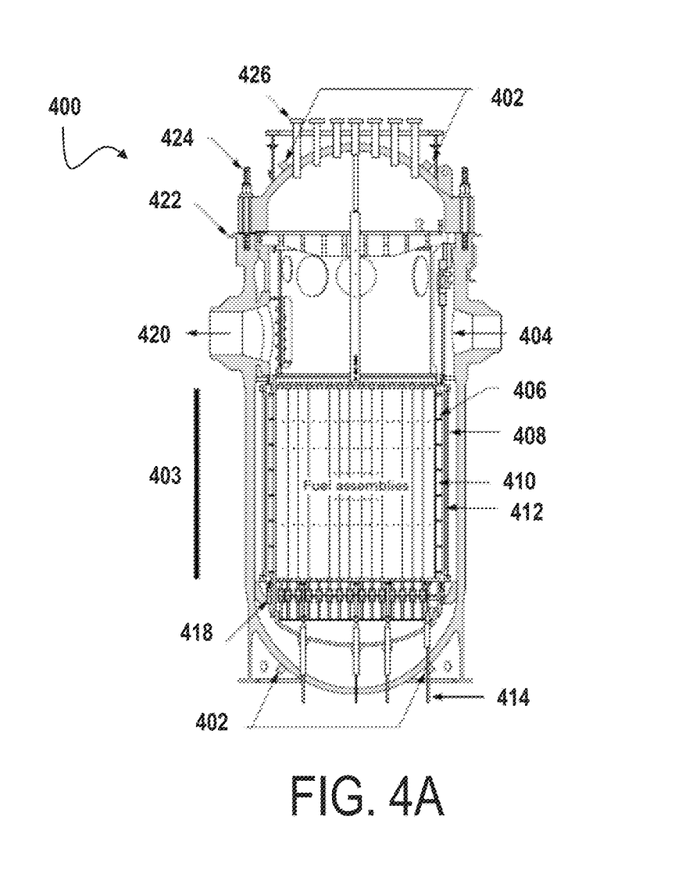
FIG. 4A illustrates a sectioned side view of an example of a core of the nuclear reactor configured for use in the system of FIG. 1, in accordance with at least one non-limiting aspect of the present disclosure.
Figure 4B:
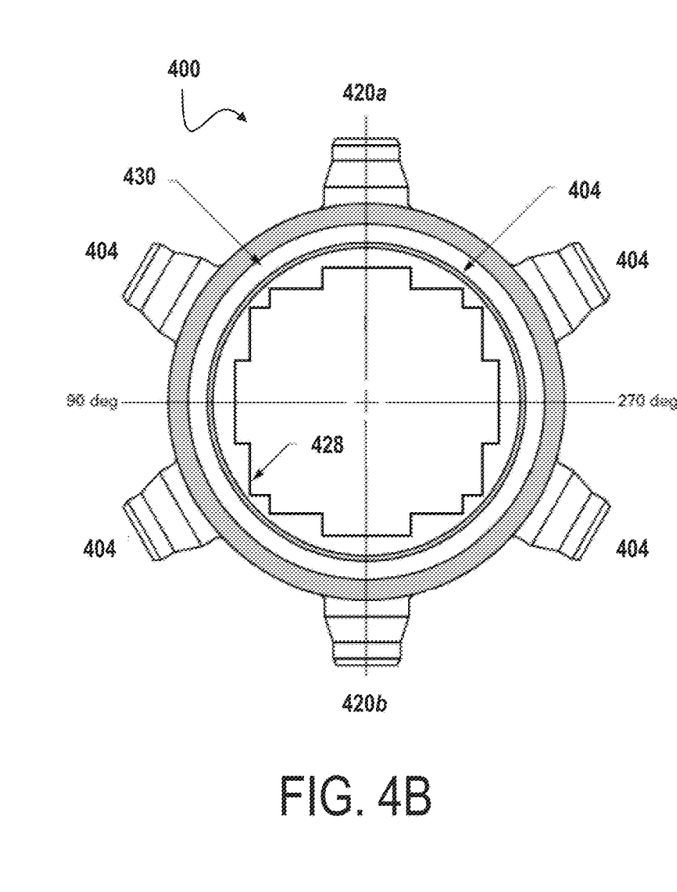
FIG. 4B illustrates a sectioned top view of an example of a core of a nuclear reactor configured for use in the system of FIG. 1, in accordance with at least one non-limiting aspect of the present disclosure.

Referring now to FIGS. 4A and 4B, an example of a core 400 of a nuclear reactor 102 configured for use in the system 100 of FIG. 1 is depicted in accordance with at least one non-limiting aspect of the present disclosure. The core 400 of FIGS. 4A and 4B illustrates one core 400 geometry that includes various components, connections, and configurations that can be monitored using the system 100 (FIG. 1) and method 300 (FIG. 3) disclosed herein, including RVI. According to the non-limiting aspects of FIGS. 4A and 4B, the core 400 can be implemented within a full nuclear steam supply system. However, it shall be appreciated that the systems 100 (FIG. 1) and methods 300 (FIG. 3) can be similarly implemented to monitor the internals of any core of any reactor system.

For example, FIG. 4A depicts a sectioned side view of the core 400 in accordance with at least one non-limiting aspect of the present disclosure. According to the non-limiting aspect of FIG. 4A, the core 400 can include external accelerometers 402 and a former plate 406. The core 400 can further include a thermal shield 408, a baffle plate 410, and a core support barrel 412. At the bottom end of the reactor 400 an instrumentation nozzle 414 can be positioned to support ancillary instrumentation to further assist in monitoring the reactor 400. A mechanical snubber 418, seal ledge 422, closure stud 424, and plurality of control rod mechanism nozzles 426 are also positioned in various positions of the core 400. The core 400 of FIGS. 4A and 4B also includes an inlet nozzle 404 and outlet nozzle 420 positioned to facilitate a desirable flow. Notably, FIG. 4A depicts one potential sensor 103 location relative to the core 400 of the nuclear reactor 102 (FIG. 1). Referring now to FIG. 4B, a sectioned top view of the core 400 of FIG. 4A is depicted in accordance with at least one non-limiting aspect of the present disclosure. According to the non-limiting aspect of FIG. 4B, the core 400 can further include a baffle plate 428 and a downcomer annulus 430. The configuration of inlet nozzles 404 is better illustrated, as is it evident that the core 400 can include both a zero degree outlet nozzle and a 420a and 180 degree outlet nozzle 420b.

According to the non-limiting aspect of FIGS. 4A and 4B, the sensor configuration can include an ex-core detector 103 positioned external relative to the core. However, according to the non-limiting aspect of FIGS. 4A and 4B, a plurality of accelerometers 402 can also be coupled to the core 400 and, as previously discussed, any additional sensors can be further implemented according to user preference and/or intended application. The accelerometers 402 can be similarly configured to generate signals associated with a mechanical response of the core 400, which the system 100 (FIG. 1) can use to monitor and assess the condition of the RVI. As previously mentioned, according to other non-limiting aspects, the sensor 403 configuration can further include an in-core detector as an alternate means of periodic monitoring. Generally, FIGS. 4A and 4B are presented to better illustrate the sensor 103 (FIG. 1) and core 102 (FIG. 1) configuration of FIG. 1. FIGS. 4A and 4B illustrate how a sensor 403 of the system 100 (FIG. 1) can be implemented to monitor various RVI of a particular core 400 configuration. However, alternate core and RVI configurations are contemplated by the present disclosure.

Various aspects of the subject matter described herein are set out in the following numbered clauses:

Clause 1: A system configured to monitor the structural health of reactor vessel internals within a nuclear reactor, the system including: a memory configured to store historical information associated with past performance of the nuclear reactor; an anomaly detection subsystem communicably coupled to the memory and a sensor, wherein the anomaly detection subsystem includes a control circuit configured to receive a signal from a sensor, wherein the signal is associated with a level of neutron noise emitted by the nuclear reactor, and wherein the anomaly detection subsystem is configured to: determine, via the control circuit, a characteristic of a vibrational response of the reactor vessel internals based, at least in part, on the received signal; access, via the control circuit, the historical information stored in the memory; compare, via the control circuit, the determined characteristic to the historical information stored in the memory; and determine, via the control circuit, a condition of the reactor vessel internals based, at least in part, on the comparison of the determined characteristic and the historical information.

Clause 2: The system according to clause 1, wherein the anomaly detection subsystem is further configured to generate, via the control circuit, a digital twin of the nuclear reactor based, at least in part, on the determined condition of the reactor vessel internals.

Clause 3: The system according to clauses 1 or 2, further including a mechanical diagnostic subsystem communicably coupled to the anomaly detection subsystem and the memory, wherein the mechanical diagnostic subsystem includes a second control circuit, and wherein the mechanical diagnostic subsystem is configured to: generate, via the second control circuit, a model of at least a portion of the nuclear reactor; and generate, via the second control circuit, a diagnostic conclusion associated with the nuclear reactor based, at least in part, on the determined condition of the reactor vessel internals and the generated model.

Clause 4: The system according to any of clauses 1-3, wherein the mechanical diagnostic subsystem is further configured to transmit, via the second control circuit, the diagnostic conclusion associated with the nuclear reactor to the anomaly detection subsystem, and wherein the digital twin of the nuclear reactor is further generated based, at least in part, on the diagnostic conclusion associated with the nuclear reactor.

Clause 5: The system according to any of clauses 1-4, wherein the generation of the diagnostic conclusion includes machine learning.

Clause 6: The system according to any of clauses 1-5, wherein the generation of the diagnostic conclusion includes Gaussian Process Regression (GPR).

Clause 7: The system according to any of clauses 1-6, further including an asset management platform communicably coupled to the anomaly detection subsystem and the mechanical diagnostic subsystem, wherein the asset management platform is configured to display a prediction associated with a future behavior of the nuclear reactor based, at least in part, on the determined condition of the reactor vessel internals and the diagnostic conclusion associated with the nuclear reactor.

Clause 8: The system according to any of clauses 1-7, wherein the asset management platform is further configured to display an alert, wherein the alert includes a suggested maintenance plan for the reactor vessel internals based, at least in part, on the determined condition of the reactor vessel internals and the diagnostic conclusion associate with the nuclear reactor.

Clause 9: The system according to any of clauses 1-8, wherein the determined characteristic includes at least one of a vibration mode frequency and an amplitude.

Clause 10: The system according to any of clauses 1-9, wherein the determined condition of the reactor vessel internals includes an anomalous condition associated with at least one of a lower radial support, a fuel nozzle, a thermal shield support, a baffle jetting, a bolt, a lower plenum, an upper plenum, a thimble tube, and a rod control cluster assembly, or combinations thereof.

Clause 11: The system according to any of clauses 1-10, further including a sensor configured to generate the signal.

Clause 12: A system configured to monitor the structural health of reactor vessel internals within a nuclear reactor, the system including: a memory configured to store historical information associated with past performance of the nuclear reactor; and a mechanical diagnostic subsystem communicably coupled to the memory, wherein the mechanical diagnostic subsystem includes a control circuit, and wherein the mechanical diagnostic subsystem is configured to: generate, via the control circuit, a model of at least a portion of the nuclear reactor; and generate, via the control circuit, a diagnostic conclusion associated with the nuclear reactor based, at least in part, on a determined condition of the reactor vessel internals and the generated model.

Clause 13: The system according to clauses 12, further including an anomaly detection subsystem communicably coupled to the memory and a sensor, wherein the anomaly detection subsystem includes a control circuit configured to receive a signal from a sensor, wherein the signal is associated with a level of neutron noise emitted by the nuclear reactor, and wherein the anomaly detection subsystem is configured to: determine, via the control circuit, a characteristic of a vibrational response of the reactor vessel internals based, at least in part, on the received signal; access, via the control circuit, the historical information stored in the memory; compare, via the control circuit, the determined characteristic to the historical information stored in the memory; and determine, via the control circuit, the condition of the reactor vessel internals based, at least in part, on the comparison of the determined characteristic and the historical information.

Clause 14: The system according to clauses 12 or 13, wherein the anomaly detection subsystem is further configured to generate, via the control circuit, a digital twin of the nuclear reactor based, at least in part, on the determined condition of the reactor vessel internals, the diagnostic conclusion, and the model.

Clause 15: The system according to any of clauses 12-14, further including an asset management platform communicably coupled to the anomaly detection subsystem and the mechanical diagnostic subsystem, wherein the asset management platform is configured to display a prediction associated with a future behavior of the nuclear reactor based, at least in part, on the determined condition of the reactor vessel internals and the diagnostic conclusion associated with the nuclear reactor.

Clause 16: The system according to any of clauses 12-15, wherein the asset management platform is further configured to display an alert, wherein the alert includes a suggested maintenance plan for the reactor vessel internals based, at least in part, on the determined condition of the reactor vessel internals and the diagnostic conclusion associate with the nuclear reactor.

Clause 17: A method of monitoring the structural health of reactor vessel internals within a nuclear reactor, the method including: receiving a signal from a sensor, wherein the signal is associated with a level of neutron noise emitted by the nuclear reactor; determining a characteristic of a vibrational response of the reactor vessel internals based, at least in part, on the received signal; accessing historical information associated with a past performance of the nuclear reactor; comparing the determined characteristic to the historical information stored in the memory; and determining a condition of the reactor vessel internals based, at least in part, on the comparison of the determined characteristic and the historical information.

Clause 18: The method according to clause 18, further including: generating a model of at least a portion of the nuclear reactor; and generating a diagnostic conclusion associated with the nuclear reactor based, at least in part, on the determined condition of the reactor vessel internals and the generated model.

Clause 19: The method according to either of clauses 17 or 18, further including generating a prediction associated with a future behavior of the nuclear reactor based, at least in part, on the determined condition of the reactor vessel internals and the diagnostic conclusion associated with the nuclear reactor.

Clause 20: The method according to any of clauses 17-19, further including generating an alert, wherein the alert includes a suggested maintenance plan for the reactor vessel internals based, at least in part, on the determined condition of the reactor vessel internals and the diagnostic conclusion associate with the nuclear reactor.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications, or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

What is claimed is:

1. A system configured to monitor structural health of reactor vessel internals within a nuclear reactor, the system comprising:
 a memory that stores historical information associated with a past performance of the nuclear reactor;
 an anomaly detection subsystem comprising a first control circuit configured to receive a signal from a sensor, wherein the signal is associated with a level of neutron noise emitted by the nuclear reactor, and wherein the anomaly detection subsystem is configured to:
  determine, via the first control circuit, a characteristic of a vibrational response of the reactor vessel internals based on the received signal;
  access, via the first control circuit, the historical information stored in the memory;
  compare, via the first control circuit, the determined characteristic to the historical information stored in the memory; and determine, via the first control circuit, a condition of the reactor vessel internals based on the comparison of the determined characteristic and the historical information; and a mechanical diagnostic subsystem communicably coupled to the memory and the anomaly detection subsystem, wherein the mechanical diagnostic subsystem comprises a second control circuit, and wherein the mechanical diagnostic subsystem is configured to:
receive, via the second control circuit, the determined condition of the reactor vessel internals from the anomaly detection subsystem;
generate, via the second control circuit, a computer-generated, three-dimensional model of at least a portion of the nuclear reactor; and
generate, via the second control circuit, a diagnostic conclusion associated with the nuclear reactor based on the determined condition of the reactor vessel internals and the computer-generated, three-dimensional model.

2. The system of claim 1, wherein the anomaly detection subsystem is further configured to generate, via the first control circuit, a digital twin of the nuclear reactor based, at least in part, on the determined condition of the reactor vessel internals, the diagnostic conclusion, and the model.

3. The system of claim 1, further comprising an asset management platform communicably coupled to the anomaly detection subsystem and the mechanical diagnostic subsystem, wherein the asset management platform is configured to display a prediction associated with a future behavior of the nuclear reactor based, at least in part, on the determined condition of the reactor vessel internals and the diagnostic conclusion associated with the nuclear reactor.

4. The system of claim 3, wherein the asset management platform is further configured to display an alert, wherein the alert comprises a suggested maintenance plan for the reactor vessel internals based, at least in part, on the determined condition of the reactor vessel internals and the diagnostic conclusion associated with the nuclear reactor.

* * * * *